United States Patent [19]
Arasuna et al.

[11] Patent Number: 5,906,755
[45] Date of Patent: May 25, 1999

[54] SPOT WELDING CONTROL METHOD AND APPARATUS

[75] Inventors: Hitoshi Arasuna; Satoru Hirayama, both of Kobe; Kazutsugu Suita, Toyota; Yoshitaka Sakamoto, Nagoya; Seiji Suzuki, Toyota, all of Japan

[73] Assignees: Kawasaki Jukogyo Kabushiki Kaisha, Kobe, Japan; Toyota Jidosha Kabushiki Kaisha, Toyota, Japan

[21] Appl. No.: 08/872,187

[22] Filed: Jun. 10, 1997

[30] Foreign Application Priority Data

Jun. 13, 1996 [JP] Japan .................................. 8-152638
Jun. 6, 1997 [JP] Japan .................................. 9-149590

[51] Int. Cl.⁶ .................................................. B23K 11/10
[52] U.S. Cl. ........................................................ 219/86.41
[58] Field of Search .............................. 219/108, 86.22, 219/86.41, 86.7, 91.1

[56] References Cited

U.S. PATENT DOCUMENTS 5,386,092  1/1995  Dufrenne .............................. 219/86.7
5,484,975  1/1996  Itatsu .................................... 219/86.7
5,582,747  12/1996  Sakai et al. ........................ 219/86.41

FOREIGN PATENT DOCUMENTS

A-6-226445  8/1994  Japan .
A-7-32160  2/1995  Japan .
A-7-64615  3/1995  Japan .
A-7-132382  5/1995  Japan .

Primary Examiner—Clifford C. Shaw
Attorney, Agent, or Firm—Oliff & Berridge, PLC

[57] ABSTRACT

The spot welding electrodes are driven by the servomotor (30) so as to be moved to and pressured against a work surface. The welding pressure controller (27) detects welding pressure corresponding to current flowing through the servomotor (30) via a driver (26) and controls the welding pressure so as to be changed according to the set welding pressure condition. The welding current flowing through the spot welding electrodes is controlled by the welding current controller (28). The welding current controller (28) and the welding pressure controller (27) are both controlled synchronously by the robot CPU (20) via the system bus (21). The robot CPU (20) controls the welding pressure and the welding current on the basis of the welding condition data (22) stored in a memory, so as to be changed in synchronism with each other at a plurality of welding stages, respectively. By doing this, it is possible to control the welding pressure and the welding current during the spot welding synchronously and systematically, thus realizing a spot welding control adaptive to work behavior.

15 Claims, 4 Drawing Sheets

SPOT WELDING CONTROL METHOD AND APPARATUS

BACKGROUND OF THE INVENTION

1. Field of the Invention

The present invention relates to a spot welding control method and apparatus.

2. Description of the Prior Art

Conventionally, spot welding has been widely used to join two metal plates (i.e, work or base material). In this spot welding, current is passed through a joint portion of the two metal plates, to join the joint portion by forming a nugget partially melted due to heat generated by resistance. In the mass production factory of automotive vehicles, in particular, a great number of welded portions are spot-welded automatically by use of a number of welder robots provided with spot welding electrodes.

FIG. 5 is a schematic block diagram showing a prior art control apparatus used for a spot welder robot. The spot welding conditions are set to a welding controller 1, and the spot welding electrodes are moved and further pressured by use of a welding pressure actuator 2. Further, when the pressuring force of the spot welding electrodes is controlled by the welding controller 1, the pneumatic pressure of an air cylinder 6 is controlled. Further, the welding pressure actuator 2 includes a programmable logic controller (referred to as PLC, hereinafter) 4 for executing the welding sequence control, a valve unit 5 electrically controlled by the PLC 4, and the air cylinder 6 controlled by the valve unit 5 on the basis of pneumatic pressure to move and pressure the spot welding electrodes. Further, the welding controller 1 includes a welding pressure controller 7 for controlling the welding pressure, and a welding current controller for controlling the welding current flowing through the spot welding electrodes.

A robot controller (electric control unit) 3 for controlling a spot welder robot includes a robot CPU 10 for controlling the robot operation in accordance with a previously determined program, in which a memory for storing welding condition data 12 can be accessed through a system bus 11. As the welding condition data 12, various welding conditions such as position data, welding time, welding pressure, welding current, etc. all necessary for spot welding are stored. Therefore, after having accessed the welding condition data 12, the robot CPU 10 moves the spot welding electrodes to a welding position of a work to be spot-welded, and sets welding pressure to the welding pressure controller 7 and welding current to the welding current controller 8, respectively both included in the welding controller 1 via an interface (referred to as I/F, hereinafter) 13 connected to the system bus 11. Here, another I/F 14 is connected to the system bus 11, so that it is possible to input or output data in and from the welding pressure actuator 2. Further, as the serial transmission signal lines 15 and 16 conforming to the RS422 standard are provided between the I/F 13 and the welding controller 1 and between the I/F 14 and the welding pressure actuator 2, respectively.

When a welding pressure is set as the welding condition data 12, the welding pressure controller 7 forms data for generating the welding pressure by the welding pressure actuator 2, and controls the pneumatic pressure of the air cylinder 6. In order to execute a highly reliable spot welding operation without defects, it is necessary to control the welding pressure according to the time stage of the spot welding and the welding current synchronized with the welding pressure systematically under optimum conditions.

The prior art technique related to the synchronous and systematic control between the welding pressure and the welding current for the spot welding is disclosed in Japanese Patent Laid-Open No. 6-226455 or No. 7-132382, for instance. In the case of the Japanese Patent Laid-Open Patent Application No. 6-226455, there is disclosed such a method that when an aluminum-lithium (Al-Li) alloy is spot-welded on the basis of resistance, a large welding current and a low welding pressure are set at the first half period of spot welding but a small welding current and a high welding pressure are set at the second half period of the same spot welding. Further, in the case of the Japanese Published Unexamined Patent Application No. 7-132382, there is disclosed such a method that a stable spot welding can be enabled, in spite of a small welding current, by switching high and low welding pressure alternately, while keeping the welding current constant or slightly increasing the welding current. In these prior art welding techniques, the welding pressure and the welding current are both changed at a plurality of the welding stages in order to form an excellent nugget at the joint portion; that is, in order that the welding can be executed under such conditions that a welding trouble such as so called "expulsion and surface flash" will not be generated.

In the prior art spot welding system as shown in FIG. 5, however, since the welding controller 1 for controlling the welding pressure and the welding current, and the welding pressure actuator 2 are both connected to each other through the system bus 11 and the two I/F 13 and 14, separately, the individual system elements are disposed separately. Therefore, there exists such a problem in that the data transmission paths are long between the respective system elements and thereby the timings required for transmission procedure are complicated, with the result that it is difficult to synchronize and execute a systematic control of both the welding current and the welding pressure during a single short time spot welding process.

Further, in the case of the spot-welded work, the joint portions of the work are not necessarily brought into tight contact with each other, but brought into tight contact with each other only after having been pressured by the spot welding electrodes. Further, when the nugget is formed by heating the resistance portion of the work by the welding current, the joint portions are thermally expanded or the melted portion and the heat generating portion are softened and thereby compressed by the welding pressure. As a result, in order to control the welding pressure of the spot welding electrodes, it is necessary to control the position of the spot welding electrodes according to change of the work status. In the case where the welding pressure is generated by the air cylinder 6 as shown in FIG. 5, when the spot welding electrodes are moved at a relatively slow speed, the welding pressure can be maintained constant. However, when the spot welding electrodes are moved at a relatively high speed, it has been difficult to control the spot-welded positions at high speed. In the case of the Japanese Published Unexamined Patent Application No. 6-226455, although the welding pressure and the welding current are both changed at two different stages, the construction of the used spot welder, in particular the construction of the pressuring mechanism of the spot welding electrodes is not shown. On the other hand, in the case of the Japanese Published Unexamined Patent Application No. 7-132382, although the welding pressure of the spot welding electrodes can be controlled by use of a welding pressure actuator including a rotation-to-straight convertor for converting the rotational motion of a motor into a straight line motion is disclosed, it is not clear the method of detecting and changing the welding pressure.

SUMMARY OF THE INVENTION

With these problems in mind, therefore, it is the object of the present invention to provide a spot welding control method and apparatus, which can easily control the welding pressure and the welding current both required during spot welding, systematically and synchronously so as to be well adaptive to work behavior.

To achieve the above-mentioned object, the present invention provides a spot welding control method, comprising the steps of: driving a mechanism for moving and pressuring spot welding electrodes by an actuator servo-controlled electrically; and changing both welding pressure corresponding to current flowing through the actuator and welding current flowing through the spot welding electrodes in synchronism with each other, at a plurality of stages respectively, in such a way that an adaptive control can be executed according to behavior of work to be welded.

In the spot welding control method according to the present invention, the mechanism for moving and controlling the spot welding electrodes is driven by an actuator which is servo-controlled electrically. Therefore, it is possible to securely execute an adaptive control according to the work behavior, by synchronizing the welding pressure corresponding to current flowing through the actuator and the welding current flowing through the spot welding electrodes with respect to each other.

Further, it is characterized that the welding pressure is high and the welding current is small at a first stage of spot welding, as compared with a second stage of the same spot welding.

In the spot welding method according to the present invention, since the welding pressure is high at the early stage of the spot welding, it is possible to improve the contact tightness between the base materials of the work to be spot welded. Therefore, since the welding current can be reduced during the process of the improved contact tightness, it is possible to prevent the internal expulsion and surface flush generated at a gap between the two base materials. Further, it is possible to improve the welding stability according to a change of the welding environment such as a change of plate arrangement, for instance.

Further, it is characterized that in the spot welding process, there exists such a stage that the welding pressure and the welding current are both controlled by a CPU concentratively in such a way that the welding pressure and the welding current both increase with the lapse of time.

In the spot welding control method according to the present invention, since there exists such a stage that the welding pressure and the welding current both increase with the lapse of time in the spot welding process, when a nugget can be formed partially, heat can be generated by current flowing through the resistance of the formed nugget, so that it is possible to grow the nugget continuously. In this case, since the nugget can be formed smoothly and naturally, even if the welding current becomes large, it is possible to prevent the surface expulsion and surface flush generated between the work surface and the spot welding electrodes.

Further, it is characterized that the step of changing both the welding pressure and the welding current comprises the steps of: at a first stage of spot welding, keeping the welding current at a first constant welding current value and the welding pressure at a first constant welding pressure value; and at a second stage of the spot welding, starting the welding current beginning from a second welding current value larger than the first welding current value; changing the second welding current value continuously to a third welding current value larger than the second welding current value; and starting the welding pressure beginning from a second welding pressure value smaller than the first welding pressure value; and changing the second welding pressure value continuously to a third welding pressure value smaller than the first welding pressure value but larger than the second welding pressure value.

In the spot welding control method according to the present invention, at the early stage, since the welding pressure is set to a first constant largest welding pressure value, it is possible to improve the contact tightness between the base materials of work to be welded. Further, at the early stage, although the first smallest welding current flows, since the base materials are brought into tight contact with each other, corona bond can be formed, so that it is possible to prevent internal "expulsion and surface flash" generated in gaps between work base materials. At the start of the later stage, since the welding current is increased from the first current value to the second current value, the nugget can be formed partially, so that a welding current path can be formed. After that, since the welding current is increased from the second welding current value to the third welding current value continuously and further since the welding pressure is increased from the second welding pressure value to the third welding pressure value also continuously, the nugget can be formed continuously. Therefore, it is possible to prevent surface "expulsion and surface flash" generated when an excessive current flows between the spot welding electrodes and the work surface, so that it is possible to form a smooth and natural nugget.

Further, the present invention provides a spot welding control apparatus, comprising: a servomotor for driving a mechanism for moving spot welding electrodes of a spot welder robot and for pressuring the spot welding electrodes against a work surface; welding pressure control means for controlling welding pressure of the spot welding electrodes against the work surface on the basis of current flowing through the said servomotor; welding current control means for controlling welding current flowing through the spot welding electrodes; a welding condition data base; and a robot CPU for controlling the welding pressure control means and the welding current control means on the basis of the welding condition data base, concentratively through a bus, in such a way that the welding pressure and the welding current are both changed in synchronism with each other at a plurality of stages, respectively.

In the spot welding control apparatus according to the present invention, the mechanism for moving and pressuring the spot welding electrodes is driven by the servomotor. Further, the welding pressure applied by the welding pressure control means to the work surface is controlled by current flowing through the servomotor. Here, since the welding pressure control means and the welding current control means for controlling the welding current flowing through the spot welding electrodes can be both controlled on the basis of the welding condition data by the robot CPU through the bus, the distance of the data transmission path can be minimized. Therefore, it is possible to execute the systematic spot welding control easily at high speed securely, without need of any adjustment of the complicated timings of the transmission procedure. Further, since the welding pressure is controlled by use of the servomotor, the response characteristics of the spot welding control can be improved by application of robot compliance control. Further, since the welding current is controlled in synchronism with change of the welding pressure, it is possible to execute the synchronous and systematic welding control, by switching various welding conditions suitable to various work welding for each of a plurality of stages, with the result that a highly reliable spot welding control can be executed without forming welding defects.

DETAILED DESCRIPTION OF THE PREFERRED EMBODIMENTS

Figure 1:
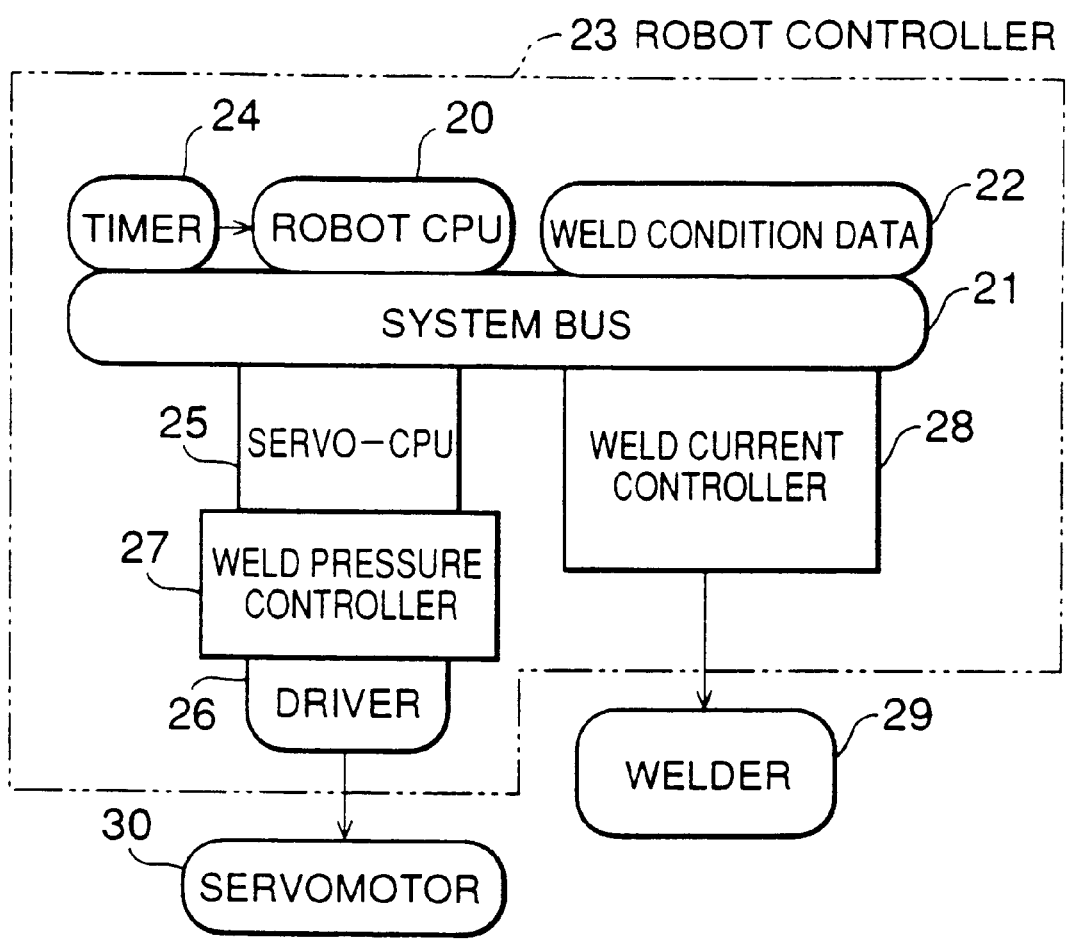
FIG. 1 is a schematic block diagram showing a first embodiment of the spot welding control apparatus according to the present invention.

FIG. 1 shows a first embodiment of the control apparatus for controlling a spot welder according to the present invention. In the present invention, the spot welding is executed by use of a welder robot controlled by a robot controller 23 including a robot CPU 20, a system bus 21, a memory for storing welding condition data 22, etc. The welding condition data 22 are stored in the form of a data base for facilitating the reference thereto. The robot CPU 20 is started by an interruption operation whenever a time previously set to a timer 24 has elapsed, and gives a command for moving and pressuring the spot welding electrodes to a servo-CPU 25 connected to the system bus 21. The servo-CPU 25 drives an actuator for moving the spot welding electrodes electrically via a driver 26. A welding pressure controller 27 detects and controls the drive current given from the driver 26 to the actuator in such a way that the welding pressure corresponding to the welding current can match the command value thereof. The robot controller 23 includes a welding current controller 28 connected to the system bus 21. The welding current controller 28 controls the welding current flowing through the spot welding electrodes via an external welder 29 disposed outside the robot controller 23.

In this embodiment, a servomotor 30 is used to move and pressure the spot welding electrodes. The servomotor 30 is rotated by the driver 26 of the robot controller 23. The ends of the spot welding electrodes are moved by converting the rotational motion of the servomotor 30 into straight motion. The end position of the spot welding electrodes can be detected in correspondence to the rotational movement of the servomotor 30. The rotational quantity of the servomotor 30 can be detected by a rotary encoder attached to a rotary shaft of the servomotor 30.

Figure 2:
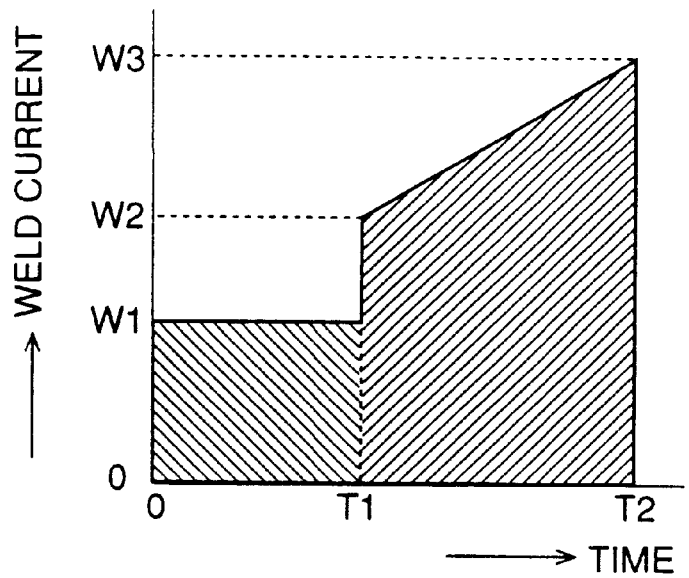
FIGS. 2(a) and 2(b) are graphical representations showing an example of the synchronous and systematic control of both the welding current and the welding pressure by the spot welding control apparatus shown in FIG. 1.
Figure 2:
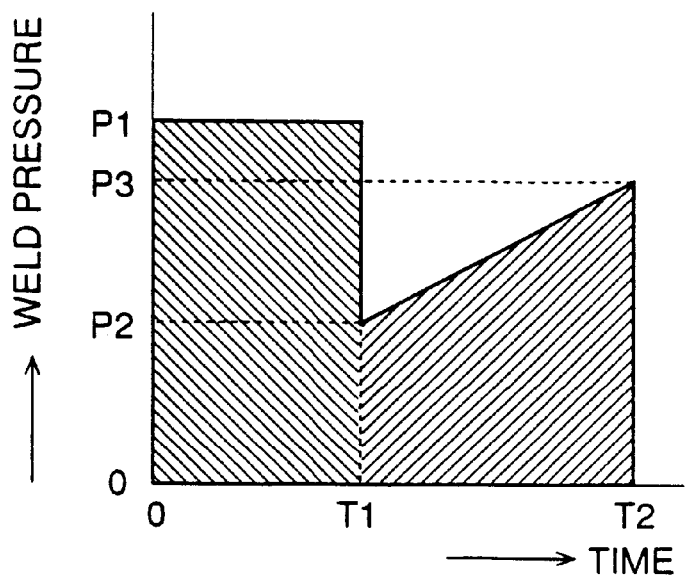

FIGS. 2(a) and 2(b) are an example of the synchronous and systematic control of both the welding current and welding pressure by the spot welding control apparatus shown in FIG. 1, respectively. In FIG. 2(a), the welding current is changed with respect to time; and in FIG. 2(b), the welding pressure is changed also with respect to time. In the spot welding process of the present embodiment, the welding time is divided into two stages of a first half stage between the start and a time T1 and a second half stage between the time T1 and a time T2. In the first half stage, the welding current is set to a relatively small constant value W1 but the welding pressure value is set to a relatively large constant value P1. Here, in the first half stage, since the welding pressure value P1 is relatively large, the contact tightness between the two base materials of a work to be welded can be improved. In other words, since the two base materials can be well brought into tight contact with respect to each other and thereby a relatively small current flows, although a sufficient nugget cannot be formed, a corona bond can be formed, so that it is possible to prevent the internal "expulsion and surface flash" generated in gaps between work base materials. Here, the welding conditions such as the welding current W1, the welding pressure P1, and the time T1 are determined previously on the basis of the experiment results.

In the second half stage after the time T1, the welding current is increased up to W2 and the welding pressure is deceased down to P2. After that, both the welding current W2 and the welding pressure P2 are both increased gradually up to W3 and P3, respectively. Since the welding current is increased from W1 to W2 at the start of the second half stage, a nugget can be formed partially, so that a conduction path can be formed. After that, since the welding current and the welding pressure are both increased, a nugget can be formed continuously, so that it is possible to form a natural and smooth nugget by an adaptive control to the work behavior, while preventing the "expulsion and surface flash" caused by an excessive current flowing between the spot welding electrodes and the work surface.

Figure 3:
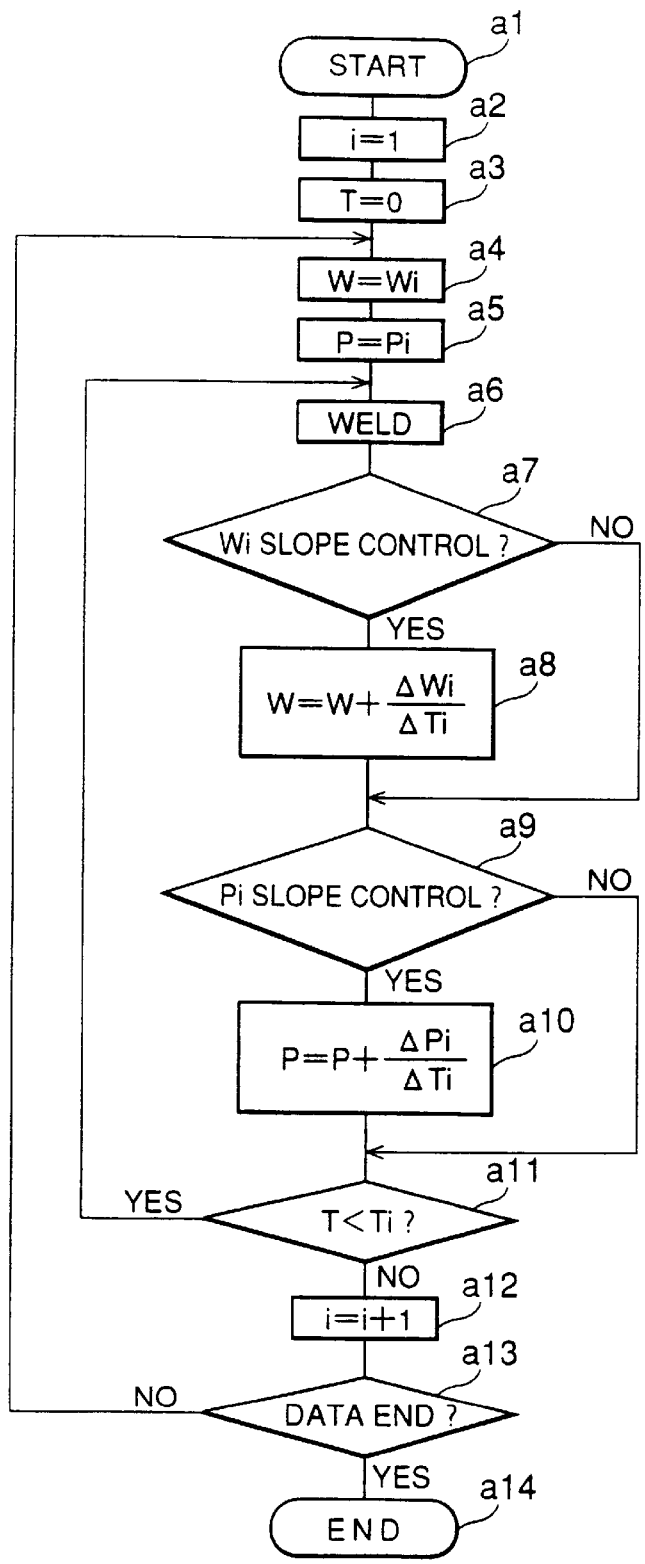
FIG. 3 is a flowchart showing the operation of the CPU 20 of the welder robot shown in FIG. 1

FIG. 3 is a flowchart showing the operation of the robot CPU 20 for executing the synchronous and systematic control of both the welding current and the welding pressure at a plurality of stages as shown in FIGS. 2(a) and 2(b).

In step a1, control at a single spot welding position starts. In step a2, parameter i indicative of the welding stage is set to "1". In step a3, the timing value T of the timer 24 is initialized and is set to "0".

In steps a4 and a5, the initial welding current Wi and the initial welding pressure Pi for the i-th stage are both read from the welding condition data 22 shown in FIG. 1 and then set. In step a6, the welding is executed in accordance with the set welding current W and the set welding pressure P for only a unit time of the control step decided by the operation of the robot CPU 20 shown in FIG. 1.

Further, in step a7, it is discriminated whether the welding current Wi is controlled along a slope on the basis of data (e.g., flag) stored together with the welding current Wi at the i-th stage. When discriminated as being slope control, in step a8, the welding current W is increased by a value ($\Delta Wi/\Delta Ti$) obtained by dividing $\Delta Wi$ by $\Delta Ti$, where $\Delta Wi$ denotes a difference in initial welding current between the (i+1)-th stage and the i-th stage, and $\Delta Ti$ denotes a ratio of the i-th stage time period to the unit time of the operation of the robot CPU 20. Here, when the welding current at the (i+1)-th stage is smaller than the welding current Wi at the i-th stage, the value of $\Delta Wi$ is negative. When the welding current Wi is discriminated as being not slope-controlled after step a8 or in step a7, in step a9 it is discriminated whether the welding pressure Pi at the i-th stage is slope-controlled or not.

In the same way as with the case of Wi, in step a9, when discriminated as being slope-controlled on the basis of a flag, for instance, in step a10 the welding pressure P is increased by a value ($\Delta Pi/\Delta Ti$) obtained by dividing $\Delta Pi$ by ΔTi, where ΔPi denotes a difference in initial welding pressure between the (i+1)-th stage and the i-th stage. When the welding pressure Pi is not slope-controlled after step a10 or in step a9, in step a11 it is discriminated whether the time T measured by the timer 24 reaches the end time Ti at the i-th stage or not. When not reaching the end time Ti, the procedure returns to step a6. In step a11, when reaching the end time Ti, in step a12 the parameter i is incremented. In step a13, it is discriminated whether the welding data have been ended (have been all used) at the new stage. Here, the welding data end can be discriminated easily by setting the data of welding current Wi and the welding pressure Pi to negative values, respectively, for instance. If data end, in step a14 the single spot welding ends. If the data does not end, the procedure returns to step a14.

In practice, the follow-up characteristics of the actual welding pressure relative to a change of the commanded welding pressure P are not necessarily excellent due to the friction and the response delay of the driving system of a gun attached to the spot welding electrodes. In addition, since there exists the case where the work is expanded thermally or softened or compressed during the welding, the actual welding pressure fluctuates away from the commend value.

Therefore, the elements related to the welding conditions such as the servo-CPU 25 for controlling the welding pressure controller 27, the welding current controller 28, the welding condition data 22, etc. are connected to each other via the system bus 21, so as to be controlled by the robot CPU 20 simultaneously and concentratively. Further, the welding current data transmitted from the welder 29, the position data applied by the welding pressure servomotor 30, the actual welding pressure data obtained by a load cell, and the feedback data of the tip end position obtained by a laser sensor are all read by the robot CPU 20, and in addition the actual welding pressure and the welding current can be synchronized with each other at real time. As a result, it is possible to realize the optimum adaptive control to the work behavior. Further, in the case of the adaptive control, only the necessary data are used, without using all the above-mentioned data. Further, the feedback control is not necessarily required.

Further, since the actual welding pressure must be measured at the current conduction portion of the spot welding electrodes, there exists the case where it is impossible to measure the actual welding pressure when the welding current is flowing. In this case, it is preferable to provide such a system that the actual welding pressure is measured when the welding current is not flowing and then feedbacked immediately, so as to automatically correct the welding pressure command data stored in the welding condition data base. Further, it is of course possible to set and use any welding pattern indicative of both the welding current and the welding pressure in a unit of the processing time of the robot CPU 20 freely or without any restriction.

Figure 4:
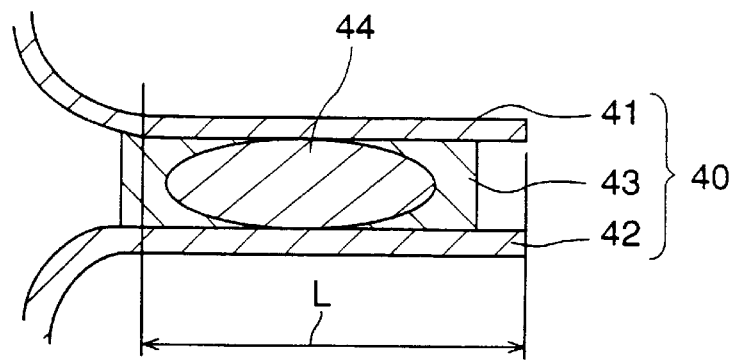
FIG. 4 is a cross-sectional view showing an example of simplified work structure, to which the spot welding control apparatus according to the present invention can be suitably applied.
Figure 5:
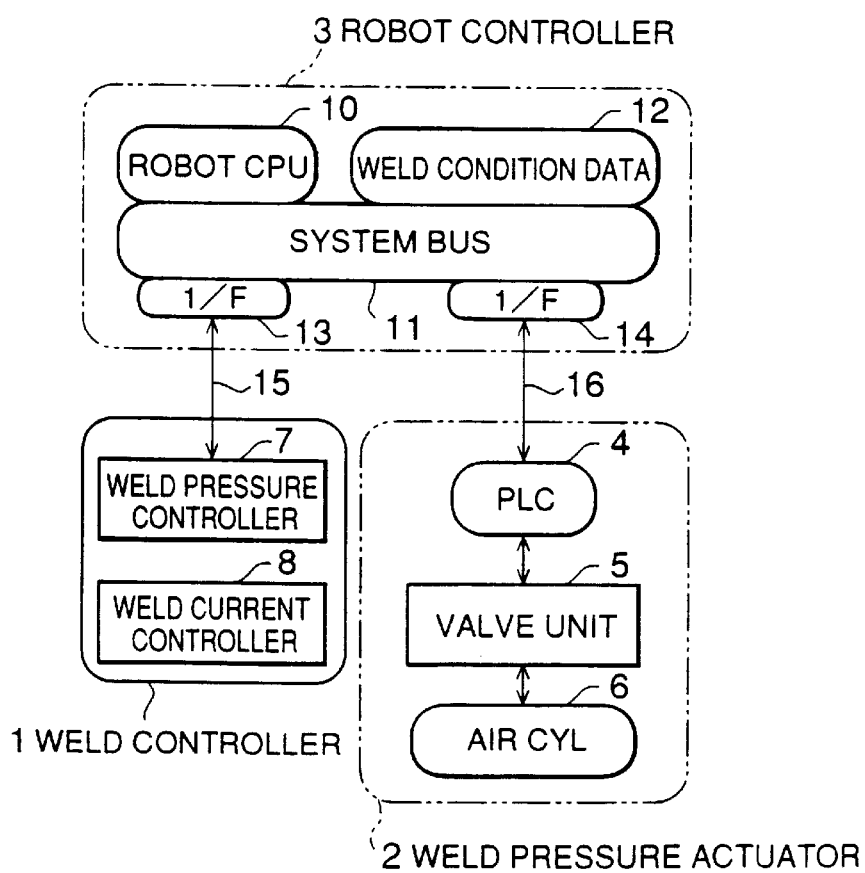
FIG. 5 is a schematic block diagram showing a prior art spot welding control apparatus.

FIG. 4 shows an example of work 40, to which the spot welding method and apparatus according to the present invention can be well applied. In FIG. 4, a spot-welded flange structure of an outer body plate of an automotive vehicle is shown. To improve the safety of an automotive vehicle, there exists a tendency that a thick plate and a high tensile force steel plate are used. Further, there exists such a tendency that the length L of the welded flange is shortened from the design standpoint or to secure a wide door opening area. In the prior art spot welding method for the spot-welded flange structure as described above, because of the frequency of occurrence of the welding quality defectiveness such as pin hole sputter, there exists a strong need of solving this problem securely. Here, for instance, the work 40 is usually composed of a zinc-plated steel plate 41 with a thickness of 0.8 mm, a bare steel plate 42 with a thickness of about 1.2 mm, and an intermediate high tensile force steel plate with a thickness of about 2.0 mm. Table 1 below lists the welding conditions for forming an excellent nugget 44 at the high tensile force steel plate 43 of the work 40.

TABLE 1

| WELDING CURRENT | WELDING PRESSURE | TIME |
|---|---|---|
| W1: 5200A | P1: 400 kgf | T1: 10/60s |
| W2: 9000A | P2: 270 kgf | T2: 22/60s |
| W3: 11000A | P3: 350 kgf | |

In the spot welding method and apparatus according to the present invention, it has been confirmed that when spot-welded under the welding conditions as listed in Table 1 above, the occurrence frequency of the pin hole sputter can be reduced down from 12% (value in the prior art welding method) to 0.2%, so that a high reliable spot welding has been confirmed. Further, since the contact tightness between the spot-welded steel plates can be improved with increasing welding pressure, the welding quality when the plate arrangement differs can be secured, so that it is not necessary to need an excessive quality for the press precision of the pressed products or for the locations of two pressed products. Further, since the welding quality can be secured according to change of the base material, the flange length, the distance between edges, etc., the spot welding method and apparatus according to the present invention is sufficiently applicable even when the welding environments change.

Further, since the welding condition data 22 are given from the robot CPU 20 to the welding pressure controller 27 and the welding current controller 28 through the system bus 21 as shown in FIG. 1, the data path is simple and therefore easy to be understood, so that the troubleshooting can be attained easily. For instance, the function of checking leakage at the welded portion can be managed by the robot CPU 20 concentratively, so that the system can be managed simply. Further, the slope control as shown in FIGS. 2(a) and 2(b) can be realized by using the function provided in the welding pressure controller 27 or in the welding current controller 28, respectively.

As described above, in the spot welding method and apparatus according to the present invention, since the mechanism for moving and pressuring the spot welding electrodes are driven by use of an actuator controlled by a servo-mechanism electrically, it is possible to execute the synchronous and systematic control of both the welding pressure and the welding current securely and easily. Therefore, it is possible to obtain a spot welding of high reliability well adaptive to work behavior, by changing the welding pressure and the welding current at a plurality of stages.

Furthermore, in the spot welding method and apparatus according to the present invention, it is possible to securely improve the contact tightness between the base materials of work to be welded at the early stage of the spot welding.

Still furthermore, in the spot welding method and apparatus according to the present invention, it is possible to obtain a high reliable welding by forming a natural and smooth nugget, while increasing the welding pressure and the welding current with the lapse of time.

In addition, in the spot welding method and apparatus according to the present invention, when the mechanism for moving and pressuring the spot welding electrodes is moved by the servomotor, the welding pressure control means controls the current flowing through the servomotor, and welding current control means controls the welding current flowing through the spot welding electrodes, Further, the welding pressure control means and the welding current control means can be both synchronized with each other by the robot CPU 20 connected to both the means via a bus, and in addition the welding pressure and the welding current can be both changed at a plurality of stages. As a result, it is possible to realize a highly reliable spot welding securely and easily, on the basis of the welding condition data base, in such a way as to form an excellent nugget under the adaptive control to the behavior of the work to be spot-welded.

What is claimed is:

1. A spot welding control method, comprising the steps of:

driving a mechanism for moving and pressuring spot welding electrodes by an actuator which is servo-controlled electrically; and changing both welding pressure corresponding to current flowing through the actuator and welding current flowing through the spot welding electrodes in synchronism with each other, at a plurality of stages, respectively, in accordance with feed back information obtained by sensors indicating the welding pressure, the welding current and a tip end position of the spot welding electrodes, whereby an optimum control on the welding pressure and the welding current can be achieved in order to make the actual welding pressure follow up to a commanded welding pressure.

2. The spot welding control method of claim 1, wherein the welding pressure is higher and the welding current is lower at a first stage of spot welding, as compared with at a second stage of the same spot welding.

3. The spot welding control method of claim 2, wherein during a second stage of the spot welding, the welding pressure and the welding current are both controlled by only one CPU such that the welding pressure and the welding current both increase with the lapse of time.

4. The spot welding control method of claim 1, wherein during a stage of a spot welding process, the welding pressure and the welding current are both controlled by only one CPU such that the welding pressure and the welding current both increase with the lapse of time.

5. The spot welding control method of claim 1, wherein the step of changing both the welding pressure and the welding current comprises the steps of:

at a first stage of spot welding, keeping the welding current at a first constant welding current value and the welding pressure at a first constant welding pressure value; and at a second stage of the spot welding, setting the welding current at a second welding current value larger than the first welding current value; and changing the second welding current value continuously to a third welding current value larger that the second welding current value; and setting the welding pressure at a second welding pressure value smaller than the first welding pressure value; and changing the second welding pressure value continuously to a third welding pressure value smaller than the first welding pressure value and larger than the second welding pressure value.

6. A spot welding control apparatus, comprising:

a servomotor for driving a mechanism for moving spot welding electrodes of a spot welder robot and for pressuring the spot welding electrodes against a work surface;

welding pressure control means for controlling welding pressure of the spot welding electrodes against the work surface on the basis of current flowing through said servomotor;

welding current control means for controlling welding current flowing through the spot welding electrodes;

a welding condition data base; and a robot CPU for controlling said welding pressure control means and said welding current control means on the basis of said welding condition data base, through a bus, such that the welding pressure and the welding current are both changed in synchronism with each other at any welding pattern, respectively.

7. The spot welding control apparatus of claim 6, wherein on the basis of said welding condition data base, said robot CPU controls said welding pressure control means such that the welding pressure is higher at a first stage of spot welding than at a second stage of the spot welding, and said robot CPU controls said welding current control means such that the welding current is smaller at the first stage of the spot welding than at the second stage of the spot welding.

8. The spot welding control apparatus of claim 7, wherein on the basis of said welding condition data base, said robot CPU controls said welding pressure control means such that the welding pressure increases with the lapse of time in the spot welding, and said robot CPU controls said welding current control means such that the welding current also increases with the lapse of time in the spot welding.

9. The spot welding control apparatus of claim 6, wherein on the basis of said welding condition data base, said robot CPU controls said welding pressure control means such that the welding pressure increases with the lapse of time in spot welding, and said robot CPU controls said welding current control means such that the welding current also increases with the lapse of time in the spot welding.

10. The spot welding control apparatus of claim 6, wherein on the basis of said welding condition data base, said robot CPU controls said welding pressure control means and said welding current control means such that:

at a first stage of the spot welding, the welding pressure is kept at a first constant welding pressure value; and at a second stage of the spot welding, the welding pressure is set beginning from a second welding pressure value smaller than the first welding pressure value and changed continuously to a third welding pressure value smaller than the first welding pressure value and larger than the second welding pressure value; and at the first stage of the spot welding, the welding current is kept at a first constant welding current value; and at the second stage of the spot welding, the welding current is set beginning from a second welding current value larger than the first welding current value and changed continuously to a third welding current value larger than the second welding current value.

11. A spot welding control apparatus, comprising:

a servomotor that drives a mechanism that moves spot welding electrodes of a spot welder robot and pressures the spot welding electrodes against a work surface;

a welding pressure controller that controls the welding pressure of the spot welding electrodes against the work surface on the basis of a current flowing through the servomotor;

a welding current controller that controls a welding current flowing through the spot welding electrodes;

a welding condition data base; and a robot CPU that controls the welding pressure controller and the welding current controller on the basis of the welding condition data base, through a bus, such that the welding pressure and the welding current are both changed in synchronism with each other.

12. The spot welding control apparatus of claim 11, wherein on the basis of the welding condition data base, the robot CPU controls the welding pressure controller such that the welding pressure is higher at a first stage of the spot welding than at a second stage of the spot welding, and the robot CPU controls the welding current controller such that the welding current is smaller at the first stage of the spot welding than at the second stage of the spot welding.

13. The spot welding control apparatus of claim 11, wherein on the basis of the welding condition data base, the robot CPU controls the welding pressure controller such that the welding pressure increases with the lapse of time in the spot welding, and the robot CPU controls the welding current controller such that the welding current increases with the lapse of time in the spot welding.

14. The spot welding control apparatus of claim 12, wherein on the basis of the welding condition data base, the robot CPU controls the welding pressure controller such that the welding pressure increases with the lapse of time in the spot welding, and the robot CPU controls the welding current controller such that the welding current increases with the lapse of time in the spot welding.

15. The spot welding control apparatus of claim 11, wherein on the basis of the welding condition data base, the robot CPU controls the welding pressure controller and the welding current controller such that:

at a first stage of the spot welding, the welding pressure is maintained at a first constant welding pressure value; and at a second stage of the spot welding, the welding pressure is initially set at a second welding pressure value smaller than the first welding pressure value and is changed continuously to a third welding pressure value that is smaller than the first welding pressure value and larger than the second welding pressure value; and at the first stage of the spot welding, the welding current is maintained at a first constant welding current value; and at the second stage of the spot welding, the welding current is initially set at a second welding current value that is larger than the first welding current value and changed continuously to a third welding current value that is larger than the second welding current value.

* * * * *